(12) United States Patent
Flack et al.

(10) Patent No.: US 7,996,881 B1
(45) Date of Patent: Aug. 9, 2011

(54) MODIFYING A USER ACCOUNT DURING AN AUTHENTICATION PROCESS

(75) Inventors: Philip W. Flack, Leesburg, VA (US);
Yan Cheng, Great Falls, VA (US);
Zhihong Zhang, Great Falls, VA (US);
Matthew Nguyen, Fairfax Station, VA (US)

(73) Assignee: AOL Inc., Dulles, VA (US)

( * ) Notice: Subject to any disclaimer, the term of this patent is extended or adjusted under 35 U.S.C. 154(b) by 1388 days.

(21) Appl. No.: 11/269,887

(22) Filed: Nov. 9, 2005

Related U.S. Application Data

(60) Provisional application No. 60/626,917, filed on Nov. 12, 2004.

(51) Int. Cl.
G06F 7/04 (2006.01)
G06F 15/16 (2006.01)
G06F 17/30 (2006.01)
H04L 29/06 (2006.01)

(52) U.S. Cl. ............ 726/3; 726/2; 726/4; 726/5; 726/6; 726/8

(58) Field of Classification Search .................. 713/183; 726/2–10
See application file for complete search history.

(56) References Cited

U.S. PATENT DOCUMENTS

| | | | |
|---|---|---|---|
| 5,999,711 A | 12/1999 | Misra et al. | |
| 6,044,471 A | 3/2000 | Colvin | |
| 6,108,789 A * | 8/2000 | Dancs et al. | 726/9 |
| 6,226,752 B1 * | 5/2001 | Gupta et al. | 726/9 |
| 6,367,009 B1 | 4/2002 | Davis et al. | |
| 6,377,691 B1 | 4/2002 | Swift et al. | |
| 6,584,505 B1 * | 6/2003 | Howard et al. | 709/225 |
| 6,643,774 B1 | 11/2003 | McGarvey | |
| 6,651,168 B1 | 11/2003 | Kao et al. | |
| 6,662,231 B1 * | 12/2003 | Drosset et al. | 709/229 |
| 6,785,825 B2 | 8/2004 | Colvin | |
| 7,389,343 B2 * | 6/2008 | Busch et al. | 709/224 |
| 7,418,502 B2 * | 8/2008 | Howard et al. | 709/225 |
| 7,426,530 B1 * | 9/2008 | Rosko et al. | 709/201 |
| 2001/0047281 A1 * | 11/2001 | Keresman et al. | 705/2 |
| 2002/0087415 A1 * | 7/2002 | Allen et al. | 705/21 |
| 2003/0001846 A1 * | 1/2003 | Davis et al. | 345/474 |
| 2003/0065556 A1 * | 4/2003 | Takanashi et al. | 705/13 |
| 2003/0188193 A1 | 10/2003 | Venkataramappa | |
| 2003/0204610 A1 * | 10/2003 | Howard et al. | 709/229 |
| 2003/0212806 A1 | 11/2003 | Mowers et al. | |

(Continued)

OTHER PUBLICATIONS

Kohl, J., and Neumann, C., "The Kerberos Network Authentication Service (V5)," The Internet Engineering Task Force, Network Working Group, Sep. 1993, 105 pgs.

Primary Examiner — Matthew B Smithers
Assistant Examiner — Jing Sims
(74) Attorney, Agent, or Firm — Finnegan, Henderson, Farabow, Garrett & Dunner, LLP

(57) ABSTRACT

Techniques are described for repairing some types of user account problems that interfere with granting a user access to a computer system and doing so during a process to authenticate the user in a way that does not require the user to re-enter authentication information or require the user to restart a communication session with the computer system. In response to a determination that a user's account has a problem during an authentication process, techniques are provided to enable a user to execute an appropriate process or processes to fix the user account, after which the authentication process continues. In this way, the correction to the user account may appear to be seamless to the user.

29 Claims, 6 Drawing Sheets

U.S. PATENT DOCUMENTS

| | | |
|---|---|---|
| 2003/0226036 A1 | 12/2003 | Bivens et al. |
| 2004/0117358 A1* | 6/2004 | von Kaenel et al. ............... 707/3 |
| 2004/0208187 A1* | 10/2004 | Mizell et al. .................. 370/401 |
| 2004/0249712 A1* | 12/2004 | Brown et al. ................... 705/14 |
| 2005/0018686 A1* | 1/2005 | Igarashi et al. ............ 370/395.2 |
| 2006/0015743 A1* | 1/2006 | Camaisa et al. .............. 713/182 |
| 2006/0168643 A1* | 7/2006 | Howard et al. ................... 726/2 |

* cited by examiner

US 7,996,881 B1

MODIFYING A USER ACCOUNT DURING AN AUTHENTICATION PROCESS

CROSS REFERENCE TO RELATED APPLICATIONS

This application claims the benefit of U.S. Provisional Application No. 60/626,917, filed Nov. 12, 2004, and titled REPAIRING USER ACCOUNT PROBLEMS DURING AUTHENTICATION CHALLENGES, which is incorporated by reference in its entirety.

TECHNICAL FIELD

This description relates to modifying user account information during a process to authenticate an identity associated with a computer systems to the another computer system.

BACKGROUND

When two systems communicate, a device or an identity using a device in one of the computer systems typically is identified to the other computer system. In some computer systems, the identity of a user or a device must be authenticated before the user or the device is permitted to access functions provided by the computer system. User authentication may be based on the presentation of a user name and a password, the combination of which is validated by the computer system. Also, a user or a device may be authenticated using a cryptographic process in which a user identity or a device is proven valid through the use of cryptographic authentication credentials.

SUMMARY

In one general aspect, authenticating a client includes receiving, through a communication session established between a client system and a host system, an indication of a problem that interferes with access by a user account associated with a user identity to a service provided by the host system. Also received is indicia of a computer application operated by the host system to be accessed to correct the problem with the user account. The indicia is used to enable user input from an operator of the user identity to the computer application to correct the problem. An indication that the problem has been corrected is received and provided to the host system to enable access by the user identity to the service through the user account. Receiving the indication of the problem, receiving the indicia of the computer application, using the indicia to enable user input, receiving the indication that the problem has been corrected, and providing the received indication to the host system occur during the communication session.

Implementations may include one or more of the following features. For example, the communication session between the client system and the host system may be maintained without disruption while the problem with the user access to the hosted service is corrected. The communication session may include multiple messages exchanged between the client system and the host system during a temporal period in which trust of the client system by the host system persists. The communication session may include multiple connections between the client system and the host system during a temporal period in which trust of the client system by the host system persists. Trust of the client system may be conditioned upon authentication of a user of the client system by the host system.

In another general aspect, a type of service is determined, and one or more authentication parameters appropriate for the type of service are identified. A determination is made whether the one or more identified authentication parameters are associated a user account, and, if not, a process is performed to enable the user's account to be configured with the identified authentication parameters. For example, a process to fix or otherwise repair an identified user account problem may be performed. The user then is authenticated, using among other criteria, the associated authentication parameters and permitted to use the type of service.

Implementations of the techniques set forth in this description may include a method or process, a system or apparatus, computer software on a computer-accessible medium, a computer program product for generating a graphical user interface, or a graphical user interface configured for presentation on a display device.

The details of one or more of the implementations are set forth in the accompanying drawings and description below. Other features will be apparent from the description and drawings, and from the claims.

DESCRIPTION OF DRAWINGS

Like reference symbols in the various drawings indicate like elements.

DETAILED DESCRIPTION

Techniques are described for repairing some types of user account problems that interfere with granting a user access to a computer system and doing so during a process to authenticate the user in a way that is relatively non-disruptive to the user, e.g., a process that does not require the user to re-enter authentication information and/or that does not require the user to restart a communication session with the computer system. More particularly, sometimes while performing an authentication challenge to control access to a host system, a deficiency or problem is experience with respect to an account for a user who is signing onto or otherwise attempting to gain access to a host system (or a service or application provided by a host system). On some occasions, the deficiency or problem interferes with or prevents the user account from being authenticated (and prevents the user from gaining the desired access). Examples of such user account problems include the account having an expired credit card number or not being configured with an Ask-Security-Question (ASQ). In response to a determination that a user's account has a problem, techniques are provided execution of an appropriate process or processes to fix the user account, after which the authentication challenge resumes. For example, a process on the host system may be executed that enables user interaction necessary to fix the identified account problem. The process (e.g., to fix the user account problem) is executed while the authentication challenge is interrupted such that the authentication challenge may be resumed in a relatively seamless manner using the fixed user account. In this way, the correction to the user account may appear seamless to the user, who maintains a communication session with the host system during the repair process and who generally need not resubmit input inspiring the access attempt.

Figure 1:
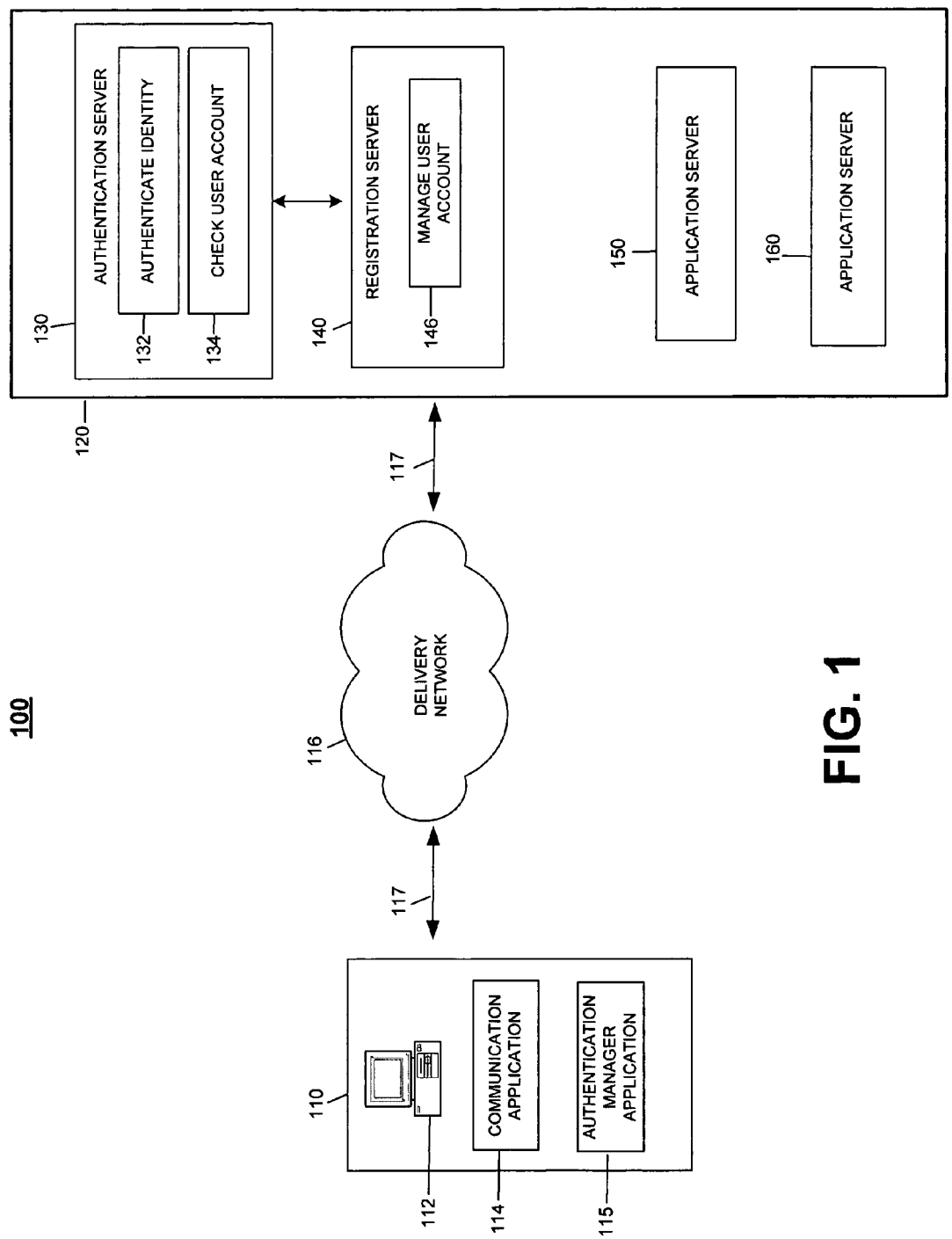
FIGS. 1, 2 and 5 are block diagrams of communications systems where a host system is capable of authenticating a client system to modify user account information during authentication.

FIG. 1 is a block diagram of a communications system 100 that is capable of delivering and exchanging messages between a client system 110 and a host system 120 through a delivery network 116. In general, the host system 120 authenticates an identity of the user using the client system 110 to access the host system 120. When a problem with the identity's user account is detected during authentication, the host system 120 provides to the client system 110 an indication of the problem and an indication of a computer application that may be used to remedy the problem. In turn, the user may use the client system 110 to access the computer application on the host system 120 to correct the problem. An indication that the problem is solved is provided to the host system 120 so that the host system 120 may authenticate the identity and permit the client system 110 to access the host system 120.

More particularly, the client system 110 may include a general-purpose computer (e.g., a personal computer, a desktop computer, or a laptop computer) capable of responding to and executing instructions in a defined manner. As shown, the client system includes a desktop computer 112. Other examples of the client system 110 include a special-purpose computer, a workstation, a server, a device, a component, other physical or virtual equipment, or some combination thereof capable of responding to and executing instructions. The client system 110 also may be a personal digital assistant (PDA), a communications device, such as a mobile telephone, or a mobile device that is a combination of a PDA and a communications device.

The client system 110 includes a communication application 114 and is configured to use the communication application 114 to establish a communication session with the host system 120 over the delivery network 116. The communication application 114 may be, for example, a browser or another type of communication application that is capable of accessing the host system 120. In another example, the communication application 114 may be a client-side application that is specifically configured to establish a communication session with the host system 120 and exchange messages with the host system 120 for the purpose of authenticating a client system or a user associated with the client system.

The client system 110 also includes an authentication manager application 115 that is configured to receive an indication of a user account problem and an indication of a computer application to fix the indicated user account problem. The authentication manager application 115 is configured to enable the user of the client system 110 to access and interact with a computer application on the host system 120 to fix the indicated user account problem. In this example, the authentication manager application 115 is configured to access the application 146 to manage a user account on the registration server 140. The authentication manager application 115 is also configured to receive an indication that the user account problem has been fixed and to forward the indication to the authentication server 130 of the host system 120. In some implementations, the functions performed by the communication application 114 and the authentication manager application 115 may be provided by a single application.

The delivery network 116 provides a direct or indirect communication link between the client system 110 and the host system 120, irrespective of physical separation. Examples of a delivery network 116 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line")), radio, television, cable, satellite, and/or any other delivery mechanism for carrying data.

The delivery network 116 may include communication pathways 117 that enable communications through the one or more delivery networks 116 described above. Each of the communication pathways 117 may include, for example, a wired, wireless, virtual, cable, or satellite communications pathway.

The host system 120 includes an authentication server 130, a registration server 140, and application servers 150 and 160. The host system 120 may be operated by an Internet access or service provider. In another example, the host system 120 may be operated by another type of business enterprise that provides multiple, secured applications to employees, suppliers, and/or customers.

The authentication server 130 generally includes one or more hardware components. An example of the authentication server 130 is a general-purpose computer capable of responding to and executing instructions in a defined manner. Other examples include a special-purpose computer, a workstation, a server, a device, a component, or other physical or virtual equipment or some combination thereof capable of responding to and executing instructions. In general, the authentication server 130 is configured to authenticate a client from the client system 110. The client authenticated by the authentication system 130 may be, for example, a user identity, a user account, a screen name of a user account that is associated with multiple screen names, a client system, or a client device.

The authentication server 130 includes instructions 132 that, when executed by a processor or processors of the authentication server 130, authenticate an identity of a user using the client system 110 to access the host system 120. The authentication server 130 also includes instructions 134 that, when executed by a processor or processors of the authentication server 130, check a user account associated with the identity to determine whether the user account has a problem or problems that interfere with authenticating the identity. Examples of such problems include an expired credit card number, the user exhausting a predetermined amount of connection time, or the account is not configured with an Ask-Security-Question (ASQ).

The authentication server 130 is configured to receive authentication information from the client system 110. For example, the authentication server 130 may receive a user name and password, an answer to an ASQ, and/or a security code generated by a security device, such as a SecurID®. The authentication server 130 is configured to use instructions 134 to check whether a problem exists with a user account associated with the client. The authentication server 130 also is configured to provide to the client system 110 an indication of a detected problem and an indication of how to access the registration server 140 to solve the problem. The authentication server 130 is configured to receive from the client system an indication that the problem has been solved and use instructions 132 to authenticate the client.

The registration server 140 may be a general-purpose or a special-purpose computer, and generally includes one or more hardware components. The registration server 140 includes instructions 146 that, when executed by a processor or processors of the authentication server 130, display and control a user interface that enables the user of the client system 110 to manage a user account, such as by creating a new user account or updating existing user account information, such as a user name, address, payment and/or billing information. The instructions 146 also may be referred to as an application 146 configured to manage a user account or a user-account management application 146. The registration server 140 is configured to enable a user of the client system 110 to fix the identified problem that interfered with authentication by accessing the user-account management application 146. The registration server 140 is also configured to send to the client system 110 an indication that the problem has been solved, such that the indication may be provided by the client system 110 to the authentication server 130.

Figure 2:
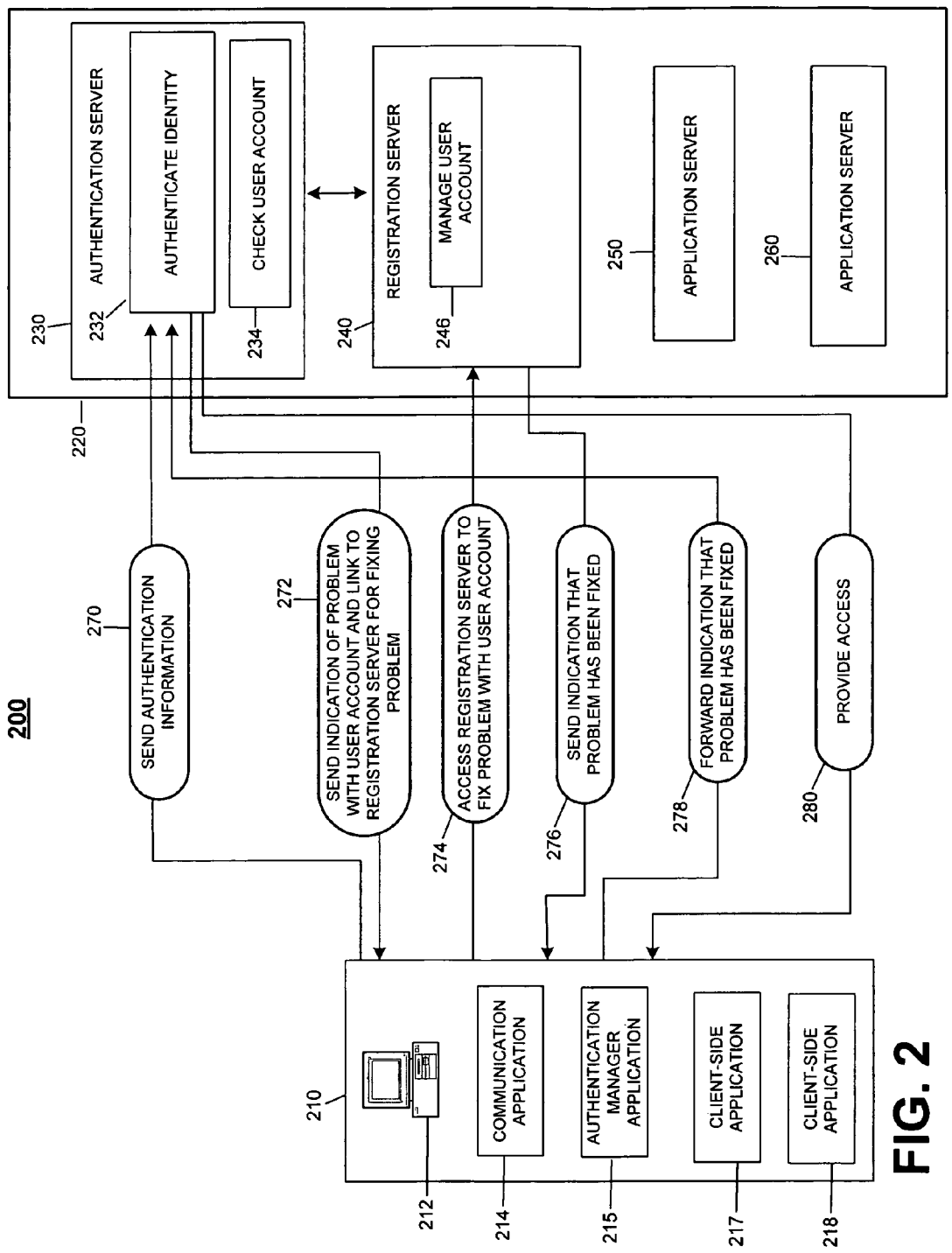

FIG. 2 illustrates another exemplary communications system 200 that is capable of authenticating a client and may be operable to seamlessly repair problems in the user account of the client arising during an authentication challenge. For convenience, the communications system 200 shown in FIG. 2 references particular componentry described with respect to FIG. 1. However, similar methodologies may be applied to other implementations where different components are used to define the structure of the system, or where the functionality is distributed differently among the components shown by FIG. 1.

The communications system 200 includes a client system 210 and a host system 220 having, among other elements, an authentication server 232, a registration server 240, and application servers 250 and 260. The communications system 200 illustrates how some types of user account problems that interfere with an authentication challenge may be repaired during the communication session.

The client system 210 includes a communication application 214 and an authentication manager application 215. The client system 210 also includes client-side applications 217 and 218, each of which are configured to access an application on the application server 250 or the application server 260, respectively. More particularly, the client system 210 may include hardware 212, such as a general-purpose computer (e.g., a personal computer, a desktop computer, or a laptop computer) capable of responding to and executing instructions in a defined manner. Other examples of hardware 212 included in the client system 210 are a special-purpose computer, a workstation, a server, a device, a component, other physical or virtual equipment, or some combination thereof capable of responding to and executing instructions. Still other examples of hardware 212 included in the client system 210 are a personal digital assistant (PDA), a communications device, such as a mobile telephone, or a mobile device that is a combination of a PDA and a communications device.

The client system 210, in response to user input, uses the communication application 214 to establish a communication session with the host system 220. In one example, a communication session established between a client system and a host system includes a series of messages exchanged during a temporal period in which trust of the client system by the host system persists. Trust of the client system may be conditioned upon authentication of a user of the client system by the host system, such as by validating a user name and password combination or validating another type of authentication information or credential. A communication session also may include the establishment and/or use of multiple connections between the client system and the host system during the temporal period of trust. When a communication session includes multiple connections, two or more of the connections may be concurrent connections, though this need not necessarily be so. A communication session further may include the establishment and/or use of multiple connections between the client system and different components of the host system, including, for example, an authentication server, a registration server, and one or more application servers. A communication session established based on the exchange and/or validation of authentication credentials "persists" until the user logs out or the communication session is otherwise ended (e.g., terminated due to a network issue or timeout).

The authentication manager application 215 of the client system 210 sends authentication information to the authentication server 230 (step 270). The authentication information may include, for example, a user name and a password. Additionally or alternatively, the authentication information may include an answer to a security question. The authentication information may include a sequence of characters generated by a security identification card, such as an RSA SecurID® available from RSA Security of Bedford, Mass., or authentication information provided through another type of authentication device. Some or all of the authentication information sent to the host system 220 may be entered by the user of the client system 210 or may be retrieved from storage associated with the client system 210. For example, the authentication manager application 215 may access a stored user name and a stored password and present a user interface for a user to enter a sequence of characters generated by a security identification card. In this example, the authentication manager application 215 sends the user name, the password, and the user-entered sequence of characters to the authentication server 230. In some implementations, sending authentication information to the authentication server 230 may involve the exchange of a series of messages between the host system 220 and the client system 210.

The authentication server 230 receives the authentication information and executes instructions 232 for authenticating an identity. For example, the authentication server 230 determines whether the received user name and password is a valid combination or otherwise determines whether the received user name is associated with a user account and the received password is associated with the same user account.

The authentication server 230 also executes instructions 234 for checking the user account associated with the identity being authenticated for account problems. For example, the authentication server 230 may check whether there is a valid credit card associated with the user account and/or whether there is an ASQ (and answer) associated with the account. In another example, when a user account is configured to grant a user a predetermined amount of access time during a particular period, the authentication server 230 may determine whether any access time remains available during the period. In still another example, when a service agreement (such as a terms of service agreement) is required, the authentication server 230 may determine whether the user account indicates that a service agreement has been executed or otherwise agreed to by the user. In yet another example, the authentication server 230 may determine whether the user account indicates that the user is permitted access to a particular service, including, for example, a premium service to which access is only permitted based on payment of a fee or an additional fee.

In the example of FIG. 2, the data structure of the user account includes data that may be checked to determine whether one or more problems exists with the user account (e.g., a credit card expiration date, an indication whether the user has signed a terms of service agreement, an indication whether there is an ASQ (and answer) associated with the account). Other data management techniques may be used. In one example, processing logic may be executed to access other data stores or structures to access data to enable determination whether one or more problems exists with the user account. Such data stores or structures may be stored or resident in one or more computer systems other than the authentication system. In such a case, for example, the authentication system may remotely execute a process to access a data store or structure or may send a message to another computer system to return an indication of an account problem. In some implementations, the authentication server 230 may interact with the registration server 240 to check the user account for problems.

In response to a determination that a problem exists with the user account, the authentication server 230 sends to the authentication manager application 215 an indication of the problem and an address link to the registration server 240 for use in correcting the user account problem (step 272). For example, the address link may be a uniform resource locator (URL), which specifies an address of a resource available at a particular Internet Protocol (IP) address.

The authentication manager application 215 on the client system 210 receives the indication of the problem and the address link. The client system 210, in response to user input, accesses the registration server 240 to enable the user to correct the problem with the user account (step 274). For example, the user of the client system 210 may activate the address link by clicking on the address link with a pointing device. In response, the client system 210 accesses the address identified by the address link. In this example, the address link identifies the application 246 to manage a user account on the registration server 240.

The registration server 240, which is executing the application 246 to manage a user account, provides a user interface that enables the user of the client system 210 to correct the account problem. For example, the user may complete an ASQ configuration process or may enter credit card information. Once the user has completed correcting the problem, the registration server 240 sends to the authentication manager application 215, which is on the client system 210, an indication that the problem has been fixed (step 276). The indication may be, for example, a code that indicates whether or not the problem has been fixed. In another example, the indication also may indicate the type of problem that was fixed. The authentication manager application 215 forwards to the authentication server 230 the indication that the problem has been fixed (step 278). The indication that the problem has been fixed may be encrypted.

The authentication server 230 receives the indication that the problem has been corrected and, in response, the authentication server 230 provides to the client system 210 access to the application server 250 and the application server 260 (step 280). For example, the authentication server 230 may verify that indication is in an expected form that addresses the problem found earlier in that communication session. In some implementations, the authentication server 230 may execute the instructions 234 to check the user account, for example, to determine whether an additional problem exists with the user account.

In some implementations, the registration server 240 may provide to the authentication manager application 215 some or all of the data used to update the user account. In such a case, the authentication manager application 215 may forward to the host system 220 a portion or all of the received update data.

Figure 3A:
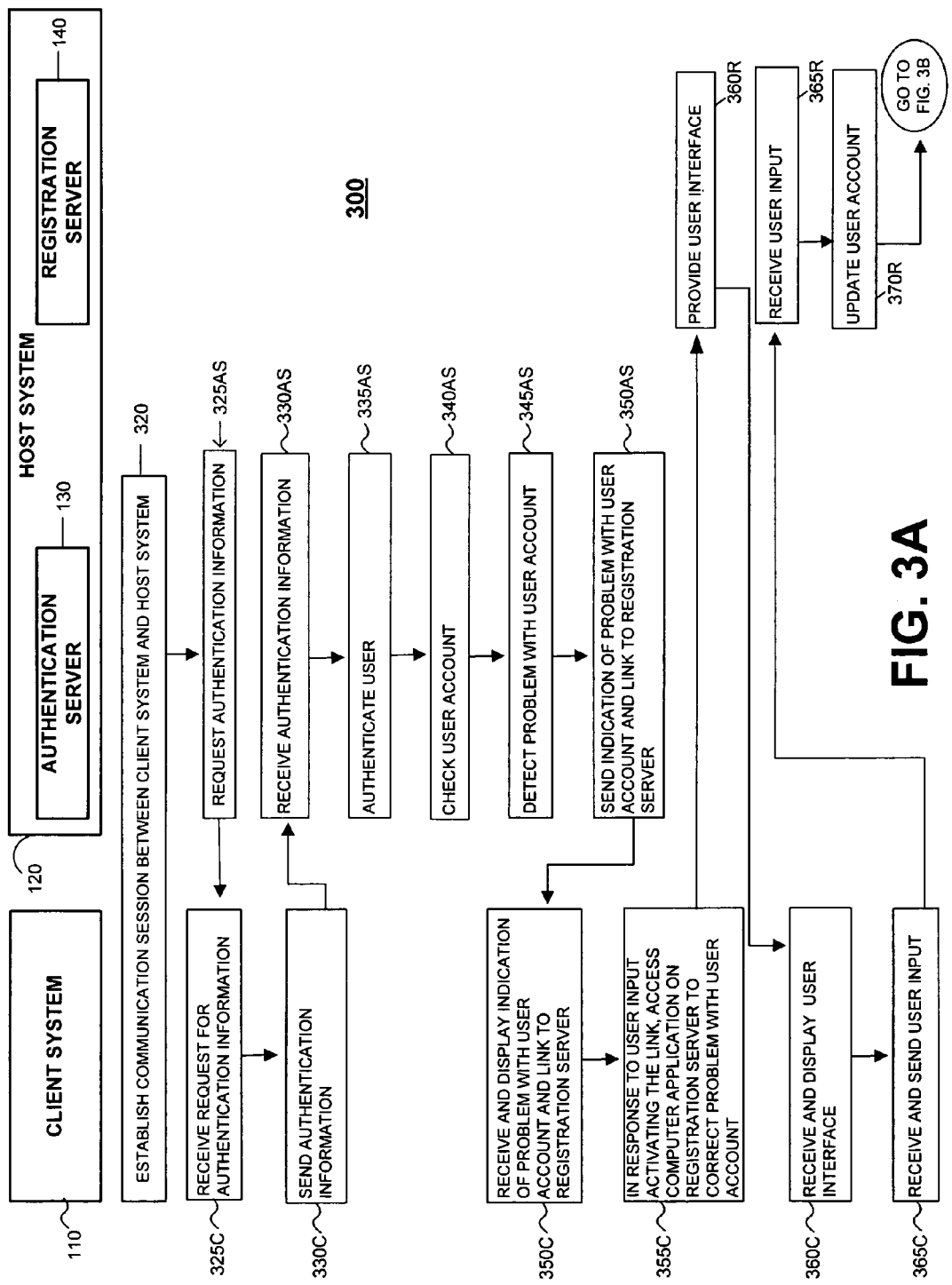
FIGS. 3A-3B are diagrams depicting a process involving the use of a client system and a host system to modify user account information during authentication.
Figure 3B:
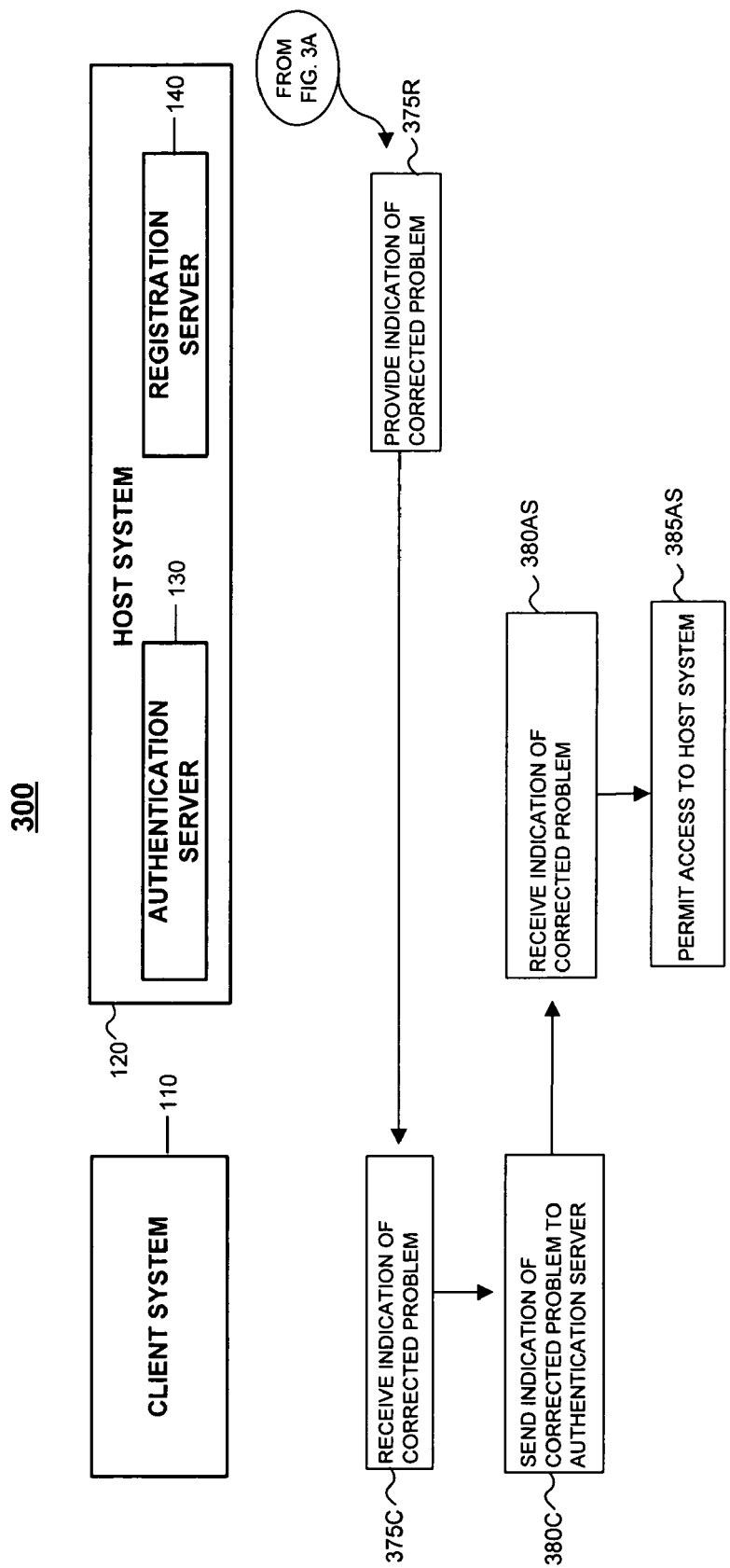

As illustrated in the system 200, the authentication manager application 215 exchanges communications with both the authentication server 230 and the registration server 240 to enable a user to correct a user account problem that otherwise would interfere with the user's authentication and access to the host system 220. The authentication server 230 grants access to the client system 210 without requiring a user of the client system 210 to re-enter or re-submit authentication information or user account data (e.g., the data used to update the user account). FIGS. 3A and 3B illustrate an exemplary process 300 including a client system 110 and a host system 120. The host system 120 includes an authentication server 130 and a registration server 140. The process 300 enables a user of the client system 110 to repair some types of user account problems that otherwise would interfere with authentication when the user is trying to gain access to the host system 120. For convenience, the process 300 shown in FIGS. 3A and 3B references particular componentry described with respect to FIG. 1. However, similar methodologies may be applied in other implementations where different componentry is used to define the structure of the system, or where the functionality is distributed differently among the components shown in FIG. 1.

The process 300 begins when the client system 110 establishes a communication session with the host system 120 (step 320). For example, the communication application 114 in the client system 110 may communicate with the authentication server 130 over the delivery network 116 to establish a communication connection. In one example using the particular componentry described with respect to FIG. 2, a client-side application 217 or 218 may use the communication application 214 to establish a communication connection with the host system 220, which may involve exchanging of a series of messages with the host system 220.

The authentication server 130 then requests authentication information (step 325AS) from the client system 110. In one example, the host system 120 sends to (or triggers invocation at) the client system 110 a sign-on user interface or display.

The client system 110 receives the request for authentication information (step 325C). For example, the client system 110 receives and displays the sign-on user interface. The sign-on user interface may enable a user to enter authentication information. The authentication information may include a user name, password, an answer to an ASQ, and/or a security code generated by a security device, such as a SecurID®. The authentication information also may include other information required specifically for a particular application provided by the host system 120, such as, for example, a secret key or a temporary password assigned to the user previously through postal mail or electronic mail (email).

In another implementation, the authentication information may be stored in the client system 110. For example, the authentication information may be stored in a user profile that is associated with the user of the client system 110. In another example, the authentication information may be saved on the client system 110, such as in a cookie associated with user of the client system 110.

The client system 110 sends the requested authentication information to the authentication server 130 (step 330C), which receives the authentication information (step 330AS).

The authentication server 130 authenticates the user (step 335AS) based on the authentication information received from the client system 110 (step 330AS). For example, the authentication server 130 may determine whether the received authentication information is consistent with information in the user account associated with a user identity identified by the authentication information. The authentication server may check whether a password matches with, or otherwise corresponds to, a password associated with the user identity. When the authentication information includes a security code generated by a SecurID®, the authentication server 130 may determine whether the received security code corresponds to an expected security code. If the received authentication information corresponds to authentication information associated with a user identity, the authentication server 130 may deem the user as authenticated.

Further, the authentication server 130 checks the user account to determine whether a problem exists with the account that would interfere with permitting a user to access the host system 120 (step 340AS). For example, the authentication server 130 may check whether the user account has, for example, a valid credit card number, whether the user account is configured to have an answer to a security question, or any other criteria required for a valid user account.

If the authentication server 130 detects a problem, or problems, with the user account (step 345AS), the authentication server 130 sends the client system 110 an indication of the problem with the user account and a link to the registration server 140 (step 350AS). The client system 110 receives an indication of user account problem and a link to the registration server 140 (step 350C). In response to user input activating the link, the client system 110 accesses a computer application on the registration server 140 to correct the problem with the user account (step 355C). In turn, the registration server 140 provides to the client system 110 a user interface (step 360R) that the client system 110 receives and displays (step 360C). The client system 110 receives user input and sends the received user input to the registration server (step 365C). The registration server 140 receives the user input (step 365R) and updates the user account (step 370R).

In some implementations, a user need not necessarily activate the link in step 335. For example, a redirection function or service may be used to automatically, without human manipulation, establish a connection between the client system 110 and the registration server 140, which results in a user interface (such as a web page) being provided to the client system 110 by the registration server 140. In an example demonstrating steps 345AS-370R, when an expired credit card is detected and interferes with a user's access to the host system 120, the user of the client system 110 may be asked to enter a valid credit card number. In another example, when a user is required to have an answer to a security question to access the host system 120 and the user has not yet configured the user's account to include an answer to a security question, the user of the client system 110 may enter an answer to an ASQ. In yet another example, a user may be permitted to access the host system 120 for only a predetermined amount of connection time during a particular period and has exceeded the predetermined amount of connection time. In such a case, the user may be offered an opportunity to purchase additional connection time or select a different basis for accessing the host system 110, such as selecting a monthly subscription that provides unlimited access.

In a more particular example of steps 350AS-370R, the authentication server 130 may send a web page that includes text explaining the detected user account problem and a link to a web page on the registration server 140, which may be used to fix the problem (step 350AS). The client system 110 receives and displays the web page (step 355C). For example, the client system 110 may receive and display the following text when an invalid credit card interferes with permitting user access:

The credit card associated with your account has expired. Please update your account with a valid credit card by clicking on this link:
    http://
        www.host120.registration.com&uid=xxx&errorid=yyy In another example, when the user account is not configured with an answer to an ASQ, the client system 110 may display the following text:

For security reasons, please provide an answer to one of the security questions by clicking on the following link:
        http://www.host120.registration.com/ASQ/
            uid=xxx&errorid=yyy A user of the client system 110 may use a pointing device to activate the displayed link. In response, the client system 110 accesses, or navigates, to a web page on the registration server 140 that enables the user of the client system to fix the account problem (step 355C). For example, the indicated link may be operable to, when activated, navigate to the manage user account application 146 of FIG. 1. The user of the client system 110 then is able to interact with the computer application on the registration server 140 to correct the user account problem (steps 360R-370R).

In some implementations, the registration server 140 may validate the newly received account information to determine whether the information fixes the problem. If not, the registration server 140 may prompt the user for additional information until the account problem is fixed. In one example, the registration server 140 may interact with the client system 110 until a valid credit card information is entered. In another example, the registration server 140 may obtain a valid answer to a security question from the client system 110 for the user identity. In yet another example, the registration server 140 may prolong the connection time allowed for client system 110 for the user identity when the newly entered account information purchases additional access time.

Referring also to FIG. 3B, once the problem with the user account has been corrected, the registration server 140 provides the client system 110 with an indication that the account problem is corrected (step 375R). For example, the registration server 140 may send to the client system 110 a confirmation code that indicates the user account is without problems or a confirmation code that indicates a particular problem with the user account has been corrected. In other examples, the registration server 140 may send to the client system 110 a digital certificate, an encrypted code, or another form of digital information as an indication that the problem has been corrected.

In this or other implementations, the registration server 140 may determine whether additional problems with the user account exist and may further enable a user of the client system 110 to fix some or all the detected user account problems.

The client system 110 receives the indication of corrected problem (step 375C), and, in response, sends the indication of corrected problem to the authentication server 130 (step 380C). In one example, the user of the client system 110 is automatically redirected to the authentication server 130 by the registration server 140 when the registration server determines that user account problem is fixed. In some implementations, the registration sever 140 also may forward the indication of corrected problem automatically to the authentication server 130. In another example, the user of the client system 110 may manually reconnect, within the temporal period of trust established based on authentication credentials of the client system 110, to the authentication server 130 after receiving the indication of corrected user account problem (step 375C). For example, upon receipt of indication of that the problem has been corrected, the client system 110 may present a user interface that enables a user to connect with the authentication server 130 within the temporal period of trust established based on authentication credentials of the client system 110.

The authentication server 130 receives the indication of the corrected problem, in this example, the indication is the confirmation code (step 380AS). The client system 110 may continue the communications with the authentication server 130 that were previously interrupted as a result of the problem with the user's account and, subsequently, is permitted to access the host system (step 385AS).

In another example, the indication of the corrected problem that the authentication server 130 receives is encrypted, and the authentication server 130 decrypts the indication.

In some implementations, the authentication server 130 may maintain and/or access an earlier record of communication with the client system 110 and verify that the received indication is as expected. For example, the authentication server 130 may check the session information of the user for an indication of the previously detected user account problem and determine whether the received indication of corrected problem to confirm that the user account problem is fixed properly. In another example, when the registration server 140 provides an indication that user account is corrected (rather than indicating a particular problem that has been fixed), the authentication server 130 may check to determine whether additional problems exist with the user account that prevent the user from accessing the host system 120. In yet another example, the authentication server 130 may verify whether the received indication is a valid or authenticate indication from the registration server 140. The host system 120 permits the client system 110 access to the host system 120 in response to the indication of the corrected problem (step 385AS). If additional problems are detected, steps 350AS-380AS are executed for the newly detected problem or problems.

In some implementations, a process similar to process 300 may be used to establish a user account enabling the user of the client system 210 to access a third-party service, such as an electronic auction service. For example, the registration server may be a registration server for a third-party service (in addition to, or in lieu of, the registration server of the host system), and the link provided in step 350AS may be a link to connect to a registration web page for the third-party service.

In some implementations, a process similar to process 300 may be used to enable a user to fix a problem with the user's password. Alternatively or additionally, a process similar to process 300 may be used to enable a user to fix a problem related to a missing authentication credential even before the user of the client system has been authenticated. For example, the user may enter a user name and incorrect or expired password. In such a case, the authentication service may provisionally authenticate the user to establish trust with the client system and then perform operations necessary to enable a user to correct the password problem, such as described previously with respect to steps 350AS to 380AS. The authentication service may then authenticate the user using the fixed password, such as by executing step 335AS.

Figure 4:
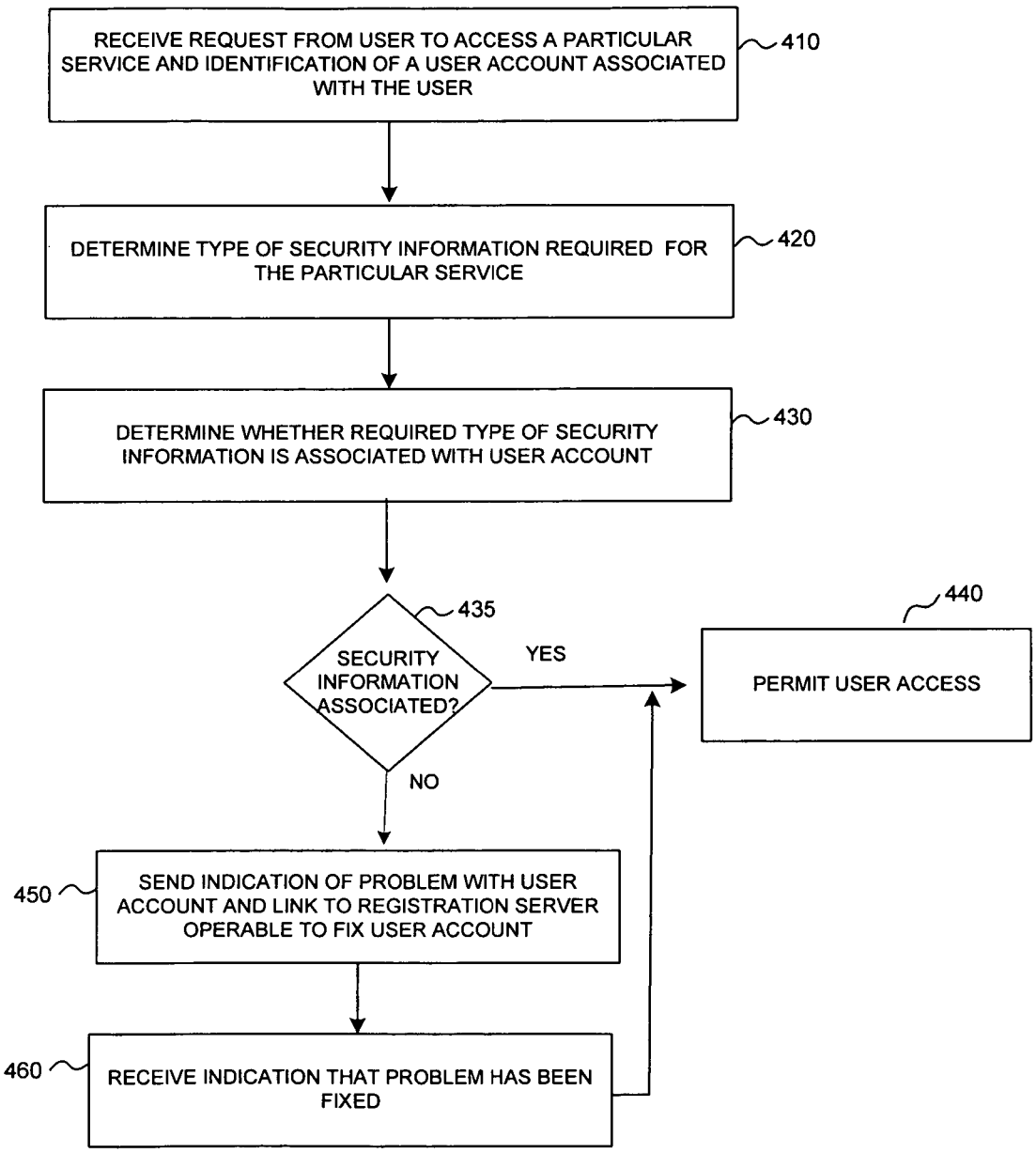
FIG. 4 is a flow chart of a process for enabling a client system to access a host system after fixing user account problems during authentication.

FIG. 4 is a flow chart that illustrates an authentication process 400 that enables a client system to access services on a host system. For convenience, the process 400 is described in terms of componentry described with respect to FIG. 1. However, similar methodologies may be applied to other implementations where different components are used to define the structure of the system and perform the functionality of the process 400, or where the functionality of the process 400 is distributed differently among the components shown by FIG. 1.

The process 400 starts when the authentication server 130 of the host system 120 receives a request from a user of the client system 110 to access a particular service and identification of a user account associated with the user (step 410). Using the example system of FIG. 1, the client system 110 may request to access a service, such as a service that is provided by application server 150 or 160 in the host system 120. The service may include, for example, retrieving information that is associated with the user account. In another example, the service may allow the user to perform actions, for example, the service may enable a user to purchase an item online or post messages to a message board.

The authentication server 130 determines the type of security information required for the particular service (step 420). In general, different services may require different types of security information. In one example, a subscription service to an on-line magazine may require a member identifier (ID) and a password to allow access. In another example, a medical history record provider service may require an answer to a ASQ to help ensure privacy of medical information. In yet another example, an access code provider service, for example, a service that is used to control access to a secure building, may require a SecurID® so that only holders of the SecurID® hardware device may access the building.

Generally, the type of security information represents a form of security required for access to the particular service. Referring to the examples given above, one type of security form may be a password that is associated with a user identity, another type security form may be an answer to a ASQ, and yet another type of security form may be a SecurID®. Additionally or alternatively, the security form may include a combination of the above mentioned security information. The security form may also include other types of, and combinations thereof, security information.

After determining the type of security information required by the particular service that the client system 110 is trying access, the authentication server 130 determines whether the required security information is associated with the user account (step 430). In general, the authentication server 130 checks the user account and determines whether the security information associated with the security form is present, and/or valid, in the user account.

When authentication server 130 determines that the type of security information is associated with the user account (step 435), the authentication server 130 permits the client system 110 access to the host system 120 (step 440). When the authentication server 130 determines that the type of security information is not associated with the user account (step 435), the authentication server 130 sends an indication of a problem with the user account and a link to registration server operable to fix user account (step 450). In general, the problem with the user account refers to a problem or problems with information that is associated with the security form in the user account, for example, missing or invalid security information. The authentication server 130 receives indication that problem has been fixed (step 460) and permits user access to the host system 120 (step 440).

In one example of steps 450, 460 and 440, the authentication server sends an indication of a problem with the user account and a link to a registration server, which enables the user operating the client system 110 to interact with the registration server 140 to fix the user account problem, as described previously with respect to steps 350AS-380C of FIGS. 3A and 3B. The authentication server 130 permits the client system 110 to access the host system 120 (e.g., access to the particular service provided by the host system 120) after receiving an indication of corrected user account problem, as described previously with respect to steps 380AS-380AS of FIG. 3B.

Figure 5:
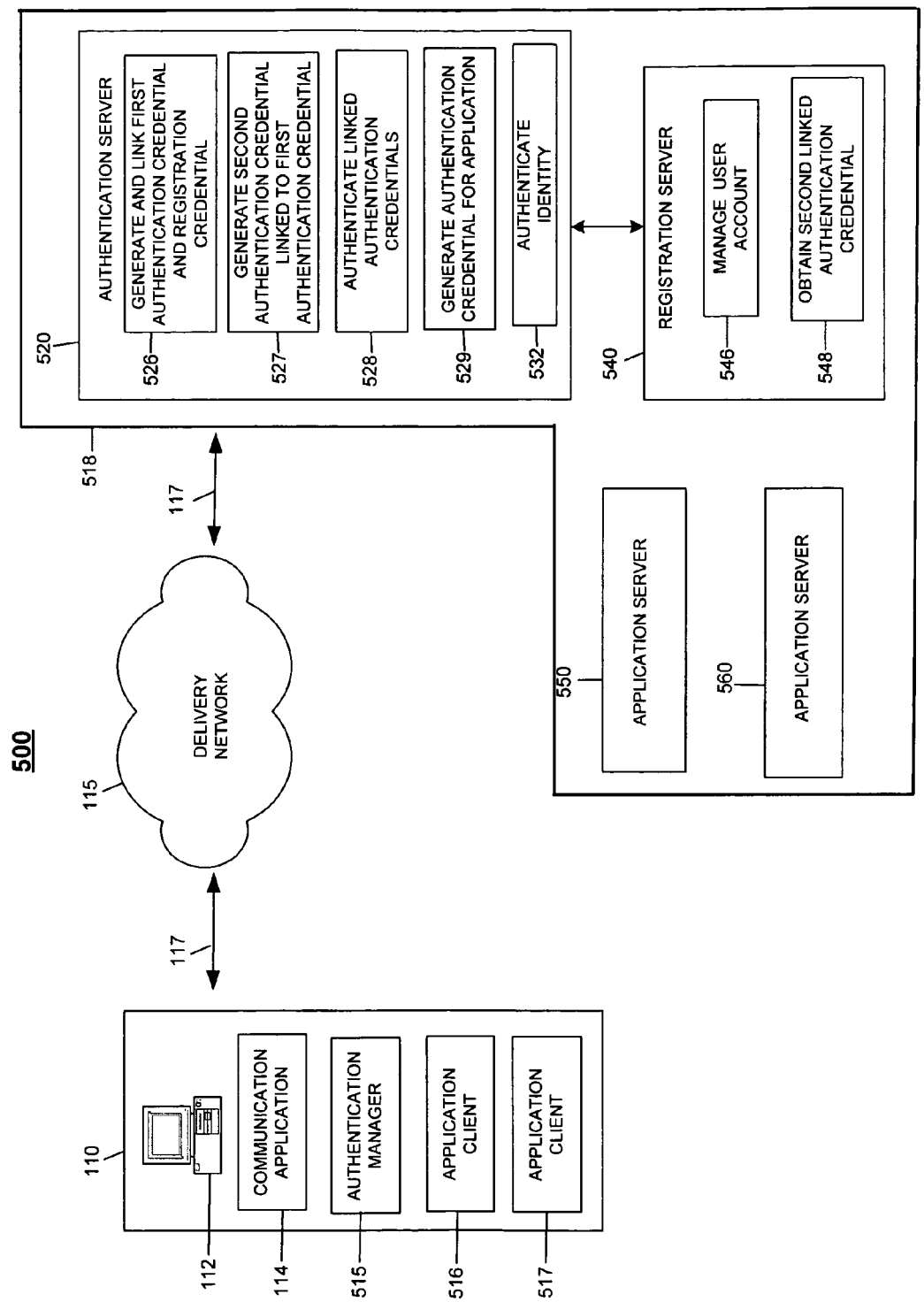

FIG. 5 is another exemplary communications system 500 that is capable of delivering and exchanging messages between a client system 110 and a host system 518. In the communications system 500, the authentication of the identity involves linked authentication credentials, one obtained from the authentication server 520 and the other obtained from the registration server 540. The two authentication credentials are obtained in two separate communications sessions and then presented together during the identity's authentication challenge in yet another communications session. Linking of the authentication credentials is explained in greater detail below.

In general, the host system 518 authenticates an identity of a user using the client system 110 to allow the user to access the host system 518. When a problem with the user account of the identity is detected during an authentication challenge, the authentication challenge is paused and the host system 518 provides to the client system an indication of the problem as well as an indication of a computer application that may be used to remedy the problem. In turn, the user may use the client system 110 to access the computer application on the host system 518 to correct the problem. An indication that the problem is solved is provided to the host system 518 so that the host system 518 may permit the client system 110 to access the host system 518. For convenience, the communications system 500 shown in FIG. 5 references particular componentry described with respect to FIG. 1. However, similar methodologies may be applied to other implementations where different components are used to define the structure of the system, or where the functionality is distributed differently among the components shown by FIG. 1.

The communications system 500 includes a client system 110 and a host system 518 having an authentication server 520, a registration server 540, and application servers 550 and 560. The client system 110 and the host system 518 are able to communicate using the delivery network 115 having communication pathways 117.

The client system 110 includes a communication application 114 and is configured to use the communication application 114 to establish a communication session with the host system 518 over the delivery network 115.

The client system 110 also includes an authentication manager application 515 that is configured to receive an indication of a user account problem and an indication of a computer application to fix the indicated user account problem. The authentication manager application 515 is configured to enable the user of the client system 110 to access and interact with a computer application on the host system 518 to fix the indicated user account problem. In this example, the authentication manager application 515 is configured to access the application 546 to manage a user account on the registration server 540. The authentication manager application 515 is also configured to receive an indication that the user account problem has been fixed and to forward the indication to the authentication server 520 of the host system 518. In some implementations, the functions performed by the communication application 114 and the authentication manager application 515 may be provided by a single application.

The client system 110 also includes client-side applications 517 and 518, each of which are configured to access an application on the application server 550 or the application server 560, respectively.

The host system 518 may be operated by an Internet access or service provider. In another example, the host system 518 may be operated by another type of business or enterprise that provides multiple secured applications to employees, suppliers, and/or customers.

The authentication server 520 may be a general-purpose or special-purpose computer. The authentication server 520 includes instructions 526 configured to, when executed, generate and link a first authentication credential to a registration credential. To link the first authentication credential and the registration credential, the authentication server 520 includes the identifier of the first authentication credential in the registration credential.

The authentication server 520 also includes instructions 527 configured to, when executed, generate a second authentication credential that is linked to the first authentication credential. To do so, the authentication server 520 includes the identifier of the first authentication credential in the second authentication credential. When generated, the second authentication is not able to be used for authentication.

The authentication server 520 also includes instructions 528 configured to, when executed, authenticate linked authentication credentials. To do so, the authentication server 520 determines whether authentication credentials that are presented together in a communication session are linked. In other words, the authentication server 520 determines whether one of the received authentication credentials includes the identifier of the other received authentication credential and, if so, determines that the authentication credentials are linked and, therefore, that the authentication credentials are valid.

The authentication server 520 also includes instructions 529 configured to, when executed, generate an application credential for presentation to an application that operates on application server 550 or application server 560.

The registration server 540 may be a general-purpose or a special-purpose computer. The registration server 540 includes instructions 546 configured to, when executed, enable a user of the client system 110 to manage a user account. For example, the user may update existing user account information, such as user name, contact information, and/or billing information. As discussed above with respect to FIGS. 1-4, if there is a problem with the user account, updating the user account while an authentication challenge is paused may be necessary to allow the user access to the host server 518. The instructions 546 also may be referred to as an application 546 to manage a user account or a user-account management application 546. The registration server 540 is configured to receive input from a user of the client system 110 and/or to display a user interface to gather input related to a user account. Such information may include, for example, a user name, address, payment and/or billing information. The registration server 540 also includes instructions 548 configured to, when executed, obtain a second authentication credential from the authentication server 520.

The communications system 500 illustrates how a host system 518 may be used to provide an authentication credential for use in authenticating a client system 110 where the authentication credential is enabled based on presentation of multiple linked authentication credentials. The client system 110 exchanges communications with the authentication server 520 to obtain a first authentication credential and a registration credential for use in managing a user account on the registration server 540.

In response to the received request, the authentication server 520 executes instructions 526 to generate and link a first authentication credential and a registration credential such that the registration credential includes the identifier of the first authentication credential. The authentication server 520 sends to the client system 110 the first authentication credential and the registration credential.

Subsequently, the client system 110 sends the registration credential to the registration server 540, which, in turn, receives the registration credential. The registration server 540 executes the user-account management application 546 and, through an exchange of messages with the client system 110, modifies the account of a user of the client system 110 to correct the problems with the account based on the presentation of the registration credential.

The registration server 540 also executes instructions 548 to obtain, from the authentication server 520, a second authentication credential that is linked to the first authentication credential. More particularly, the registration server 540 provides the registration credential to the authentication server 520. In response to receiving the registration credential, the authentication server 520 executes instructions 527 to generate a second authentication credential that is linked to the first authentication credential. To do so, the authentication server 520 generates an authentication credential that includes the identifier of the first authentication credential. The authentication server 520 is able to do so because the registration credential includes the identifier of the first authentication credential. The second authentication credential generated by the authentication server 520, however, initially may not able to be used by itself to authenticate the client system 110. For example, the authentication server 520 may mark, or otherwise designate, the second authentication credential as "invalid," "inactive" or otherwise unusable. The authentication server 520 sends the unusable second authentication credential to the registration server 540, which, in turn, forwards the unusable second authentication credential to the client system 110. Because the second authentication credential is marked as unusable, the second authentication credential may not be used if misappropriated during transmission to the client system 110.

The client system 110 establishes a secure communication session with the authentication server 520 and uses the secure communication session to send to the authentication server 520 the first and the second authentication credentials that previously were provided to the client system 110 in separate communication sessions.

The authentication server 520 receives the first and second authentication credentials and executes instructions 528 to determine whether the first and second authentication credentials are linked. To do so, the authentication server 520 determines whether the second authentication credential that is marked as unusable includes the identifier of the first authentication credential. When the authentication server 520 determines that the second authentication credential is linked to the first authentication credential, the authentication server 520 marks the second authentication credential as "valid," "active," or otherwise as usable. The authentication server 520 then provides to the client system 110, over the secure communication session, the second authentication credential that is now enabled to authenticate the client system 110.

Once the client system 110 is authenticated, the authentication server 520 checks the user account associated with the identity being authenticated for account problems. As discussed previously, account problems may include an expired credit card number and/or whether there is an ASQ associated with the account. Also as discussed previously, if there is a problem with the user account, the authentication server 520 sends the authentication manager 515 an indication of the problem and a link to the registration server 540 for use in correcting the problem. Similarly to the processes and communication systems discussed above, the user may correct the problem with the user account and the interrupted authentication challenge is resumed using the corrected account information.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method of authenticating a client, the method comprising:

providing, by a client system, authentication information to an authentication server, the authentication server using the authentication information to authenticate the client system;

receiving, at the client system from the authentication server of a host system, an indication of a problem with an existing user account associated with a user identity, the problem interfering with access by the existing user account to a service provided by the host system, the indication of the problem being received during a communication session established between the client system and the host system;

receiving, at the client system from the authentication server, indicia of a computer application on a registration server of the host system;

using, at the client system, the indicia to access the computer application on the registration server to correct the problem with the existing user account through user input;

receiving, at the client system from the registration server, an indication that the problem has been corrected; and providing the received indication, from the client system to the authentication server, to enable access by the user identity to the service through the user account, wherein receiving the indication of the problem, receiving the indicia of the computer application, using the indicia to access the computer application, receiving the indication that the problem has been corrected, and providing the received indication to the host system occur during the communication session.

2. The method of claim 1 wherein the method further comprises maintaining, without disruption, the communication session between the client system and the host system while the problem with the user access to the hosted service is corrected.

3. The method of claim 1 wherein multiple messages are exchanged between the client system and the host system during a temporal period of the communication session in which trust of the client system by the host system persists.

4. The method of claim 3 wherein the trust of the client system is conditioned upon authentication of a user of the client system by the host system.

5. The method of claim 1 wherein multiple connections are established between the client system and the host system during a temporal period of the communication session in which trust of the client system by the host system persists.

6. The method of claim 5 wherein the trust of the client system is conditioned upon authentication of a user of the client system by the host system.

7. The method of claim 1 wherein the indicia of the computer application is an indicia of a location of the computer application.

8. The method of claim 1 wherein:
access to the service requires security information,
the problem with the user account comprises an absence of an association between the security information required to access the service and the user account, and
the method further comprises using the accessed computer application to enable user input, from an operator of the user identity at the client system to the registration server, to correct the problem, the step of using the accessed computer to enable user input comprising:
enabling user input of information related to the security information required to access the service, and
enabling an association of the information related to the security information with the user account.

9. The method of claim 8 wherein receiving the indication that the problem has been corrected comprises receiving an indication that the security information required to access the service is not associated with the user account.

10. The method of claim 8 wherein receiving the indication that the problem has been corrected comprises receiving information corresponding to the user input enabled by using the accessed computer application.

11. The method of claim 8 wherein the security information comprises user input of a response to a presented question to authenticate the user identity.

12. The method of claim 1, wherein the registration server is different from the authentication server.

13. The method of claim 1, wherein receiving the indication of the problem with the existing user account comprises receiving an indication that a credit card associated with the existing user account has changed from a valid credit card to an expired credit card.

14. The method of claim 1, wherein receiving the indication of the problem with the existing user account comprises receiving an indication that a predetermined amount of access time that the existing user account is allowed to access the service has expired.

15. The method of claim 1, wherein receiving the indication of the problem with the existing user account comprises receiving an indication that an Ask-Security-Question (ASQ) and answer have not been setup for the existing user account.

16. The method of claim 1, wherein the authentication information includes a password.

17. A method of authenticating a client, the method comprising:

receiving, by an authentication server, authentication information from a client system, the authentication server using the authentication information to authenticate the client system;

providing, to the client system from the authentication server of a host system, an indication of a problem with an existing user account associated with a user identity, the problem interfering with access by the existing user account to a service provided by the host system, the indication of the problem being received during a communication session established between the client system and the host system;

providing, to the client system from the authentication server, indicia of a computer application on a registration server of the host system;

enabling use, at the client system, of the indicia to access the computer application on the registration server to correct the problem with the existing user account through user input;

providing, from the registration server to the client system, an indication that the problem has been corrected conditioned upon a determination that the problem has been corrected;

receiving, at the authentication server from the client system, the indication that the problem has been corrected; and enabling access by the user identity to the service through the user account conditioned upon receipt of the indication at the authentication server that the problem has been corrected, wherein providing the indication of the problem, providing the indicia of the computer application, enabling use of the indicia to access the computer application, providing the indication that the problem has been corrected, receiving from the client system the indication that the problem has been corrected, and enabling access occur during the communication session.

18. The method of claim 17 wherein the method further comprises maintaining, without disruption, the communication session between the client system and the host system while the problem with the user access to the hosted service is corrected.

19. The method of claim 17 multiple messages are exchanged between the client system and the host system during a temporal period of the communication session in which trust of the client system by the host system persists.

20. The method of claim 19 wherein the trust of the client system is conditioned upon authentication of a user of the client system by the host system.

21. The method of claim 17 wherein multiple connections are established between the client system and the host system during a temporal period of the communication session in which trust of the client system by the host system persists.

22. The method of claim 21 wherein the trust of the client system is conditioned upon authentication of a user of the client system by the host system.

23. The method of claim 17, wherein providing the indication of the problem with the existing user account comprises providing an indication that a credit card associated with the existing user account has changed from a valid credit card to an expired credit card.

24. The method of claim 17, wherein providing the indication of the problem with the existing user account comprises providing an indication that a predetermined amount of access time that the existing user account is allowed to access the service has expired.

25. The method of claim 17, wherein providing the indication of the problem with the existing user account comprises receiving an indication that an Ask-Security-Question (ASQ) and answer have not been setup for the existing user account.

26. A computer program product tangibly stored in a machine-readable storage device, the computer program product including instructions that, when executed, enable authentication of a client system, the computer program product configured to:
provide, by a client system, authentication information to an authentication server, the authentication server using the authentication information to authenticate the client system;
receive, at the client system from the authentication server of a host system, an indication of a problem with an existing user account associated with a user identity, the problem interfering with access by the existing user account to a service provided by the host system, the indication of the problem being received during a communication session established between the client system and the host system;
receive, at the client system from the authentication server, indicia of a computer application on a registration server of the host system;
use, at the client system, the indicia to access the computer application on the registration server to correct the problem with the existing user account through user input;
receive, at the client system from the registration server, an indication that the problem has been corrected; and
provide the received indication, from the client system to the authentication server, to enable access by the user identity to the service through the user account,
wherein receiving the indication of the problem, receiving the indicia of the computer application, using the indicia to access the computer application, receiving the indication that the problem has been corrected, and providing the received indication to the host system occur during the communication session.

27. The computer program product of claim 26 wherein multiple messages are exchanged between the client system and the host system during a temporal period of the communication session in which trust of the client system by the host system persists.

28. The computer program product of claim 26 wherein multiple connections are established between the client system and the host system during a temporal period of the communication session in which trust of the client system by the host system persists.

29. A method of allowing a client to access a service offered by a host system, the method comprising:
establishing a communication session between a client system and a host system, the host system including an authentication server and a registration server;
providing, by the client system, authentication information to the authentication server, the authentication server using the authentication information to authenticate the client system;
receiving, at the client system from the authentication server, a message indicating existence of a problem with an existing user account associated with a user identity, the problem interfering with access by the existing user account to a service provided by the host system;
in response to the message, providing a display to a user operating under the user identity at the client system that informs the user of the problem and that includes a link selectable by the user to access the registration server of the host system to correct the problem with the existing user account;
in response to the user selecting the link, accessing the registration server and enabling the user to provide information to the registration server to correct the problem;
receiving, at the client system from the registration server, a first message that informs the client system that the problem has been corrected;
in response to receiving the first message that informs the client system that the problem has been corrected, sending, from the client system to the authentication server, a second message that informs the authentication server that the problem has been corrected to enable access by the client system to the service through the user account,
wherein receiving the message indicating existence of a problem, providing the display to a user operating under the user identity, accessing the registration server and enabling the user to provide information to the registration server to correct the problem, receiving the first message, and sending the second message occur during the communication session.

* * * * *